No. 814,925. PATENTED MAR. 13, 1906.
F. E. WEBSTER.
GOLD CATCHER FOR FOUNTAIN SPITTOONS.
APPLICATION FILED OCT. 19, 1904.
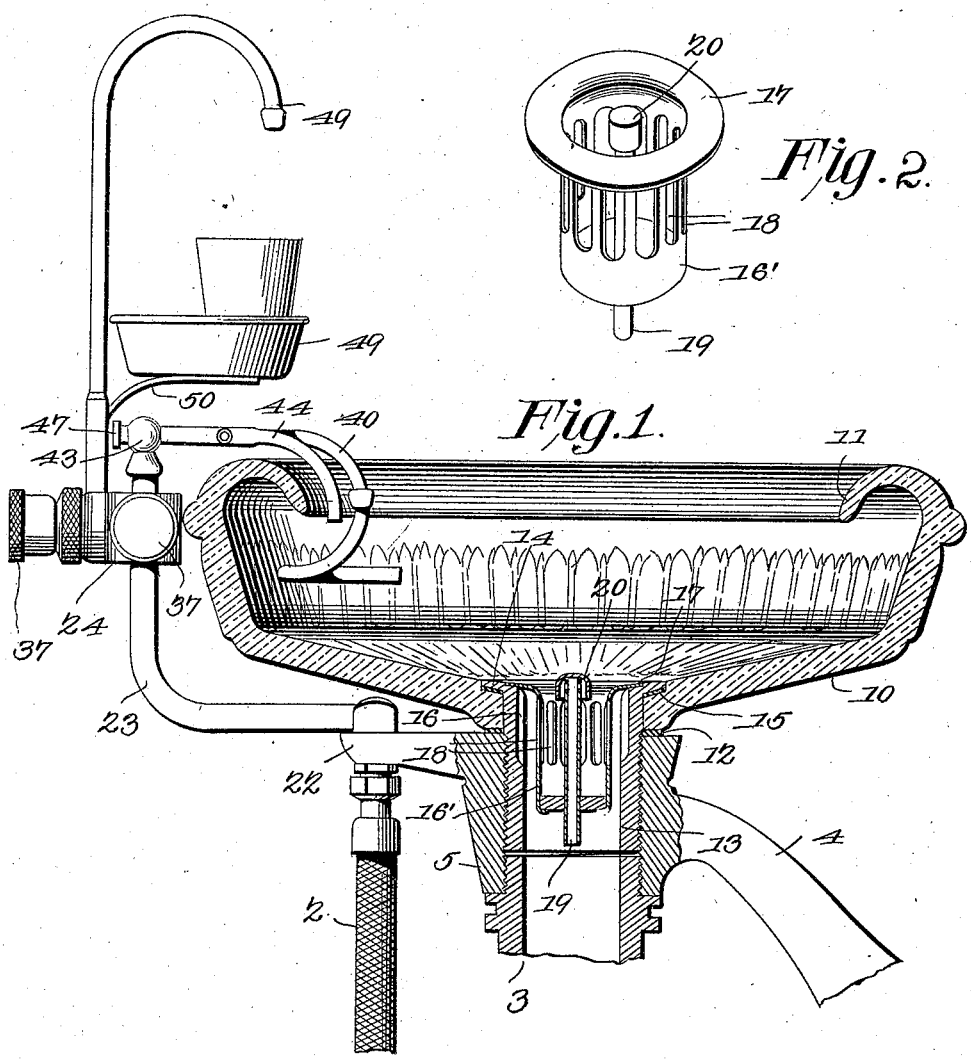
Witnesses
Frank E. Webster,
Inventor
by C. A. Snow & Co.
Attorneys

UNITED STATES PATENT OFFICE.

FRANK E. WEBSTER, OF BUFFALO, NEW YORK.

GOLD-CATCHER FOR FOUNTAIN-SPITTOONS.

No. 814,925.　　　Specification of Letters Patent.　　Patented March 13, 1906.

Application filed October 19, 1904. Serial No. 229,190.

*To all whom it may concern:*

Be it known that I, FRANK E. WEBSTER, a citizen of the United States, residing at Buffalo, in the county of Erie and State of New York, have invented a new and useful Gold-Catcher for Fountain-Spittoons, of which the following is a specification.

This invention relates to strainers and traps, and has for its principal object to provide a novel form of trap to be used in connection with bowls or the like for receiving and retaining heavy material which may flow from the bowl while the water is allowed to escape.

A further object of the invention is to provide a trap of this type that may be readily removed from position and in which a free air-vent is provided, so that the water may escape without noise.

With these and other objects in view, as will more fully hereinafter appear, the invention consists in certain novel features of construction and arrangement of parts hereinafter fully described, illustrated in the accompanying drawings, and particularly pointed out in the appended claim.

In the accompanying drawings, Figure 1 is a sectional elevation of a bowl of the type usually employed for fountain-spittoons, provided with a trap constructed in accordance with the invention. Fig. 2 is a detail perspective view of the trap detached.

Similar numerals of reference are employed to indicate corresponding parts throughout both figures of the drawings.

The bowl 10 is mounted on a bracket 4, the end of the bracket having an enlarged head 5, between which and the bowl is arranged a packing 12. The head is provided with a threaded opening, to which is coupled the upper end of a waste-pipe 3, and through an opening in the central lower portion of the bowl extends a threaded sleeve 13, screwing into the threaded opening in the head 5. At the upper end of this sleeve is an annular flange 14, between which and the bore is placed a gasket 15. The sleeve is provided with a pair of diametrically-opposing slots 16, into which a wrench or similar tool may be inserted for the purpose of screwing and unscrewing the sleeve.

Within the sleeve is hung a cup-shaped trap 16', having at its upper end an annular flange 17, that rests in an annular seat formed in the flange 14 of the sleeve. The vertical wall of the cup is provided with a plurality of slits or openings 18, through which the water may freely flow, the lower edges of said openings terminating at a point considerably above the bottom of the trap, so that gold or similar material passing from the bowl will fall by gravity to the bottom of the trap, while the water escapes through the openings, there being sufficient space between the periphery of the trap and the bore of the sleeve 13 to permit the outflow.

The bottom of the trap is formed of a disk having a central opening for the passage of a tube 19, the lower end of which extends below the bottom of the trap, while the outer end thereof extends above the flange 17 and is provided with perforations in order to permit the free escape of air from the waste-pipe. The top of the tube is covered by an overhanging cap 20, which also forms a convenient finger-hold for removing or inserting the trap.

Having thus described the invention, what is claimed is—

A trap comprising a cylindrical body portion, closed at the bottom and provided at the upper end with an outwardly-extending flange, the vertical wall of the cylinder being provided with a plurality of openings at a point above the closed bottom thereof, a tube extending through the bottom, the upper end of the tube being continued to a point adjacent to the top of the trap, and the upper end of said tube being perforated, and a hood or cap extending over the top of the tube and forming a finger-hold for removing said trap and a protection against clogging of the tube.

In testimony that I claim the foregoing as my own I have hereto affixed my signature in the presence of two witnesses.

FRANK E. WEBSTER.

Witnesses:
　EDWIN R. DAVIS,
　WM. H. MOYER.